United States Patent
Morenko et al.

(10) Patent No.: US 11,466,860 B2
(45) Date of Patent: Oct. 11, 2022

(54) FUEL MANIFOLD ASSEMBLY

(71) Applicant: PRATT & WHITNEY CANADA CORP., Longueuil (CA)

(72) Inventors: Oleg Morenko, Oakville (CA); Aleksandar Kojovic, Oakville (CA); Bryan Micheal Bond, Alliston (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/315,495

(22) Filed: May 10, 2021

(65) Prior Publication Data
US 2021/0262666 A1   Aug. 26, 2021

Related U.S. Application Data

(62) Division of application No. 16/149,547, filed on Oct. 2, 2018, now Pat. No. 11,060,731.

(51) Int. Cl.
*F02C 7/22* (2006.01)
*F23R 3/28* (2006.01)
*F23R 3/34* (2006.01)

(52) U.S. Cl.
CPC .............. *F23R 3/343* (2013.01); *F02C 7/222* (2013.01); *F23R 3/283* (2013.01); *F05D 2240/35* (2013.01)

(58) Field of Classification Search
CPC .. F02C 7/22; F02C 7/222; F02C 7/228; F23R 3/28; F23R 3/283; F23R 3/343
See application file for complete search history.

(56) References Cited

U.S. PATENT DOCUMENTS 3,516,252 A * 6/1970 Beane .................. F23R 3/283
                                                        60/739
3,991,561 A    11/1976 Leto
4,467,610 A * 8/1984 Pearson .................. F02C 7/222
                                                        60/742
4,708,371 A * 11/1987 Elsworth ................. F16L 37/56
                                                        285/120.1
7,992,390 B2    8/2011 Patel et al.
(Continued)

FOREIGN PATENT DOCUMENTS

EP        2902605 A1    8/2015
EP        2942509 A1   11/2015
WO   WO2013192523 A1  12/2013

*Primary Examiner* — Scott J Walthour
(74) *Attorney, Agent, or Firm* — Norton Rose Fulbright Canada LLP

(57) ABSTRACT

A fuel supply assembly for a gas turbine engine comprises a plurality of fuel injectors configured for mounting circumferentially to an engine casing of the gas turbine engine and to be serially interconnected. At least one pair of the plurality of the fuel injectors has a first fuel injector including a first manifold adapter having a first outlet defined around a first outlet axis, and a first stem connected to the first manifold adapter at the first outlet and extending longitudinally along a first stem axis; and a second fuel injector including a second manifold adapter having a second outlet defined around a second outlet axis, and a second stem connected to the second manifold adapter at the second outlet, the first and second outlet axes being disposed circumferentially between the first and second stem axes.

5 Claims, 6 Drawing Sheets

(56) References Cited

U.S. PATENT DOCUMENTS

| | | | |
|---|---|---|---|
| 2010/0050645 A1* | 3/2010 | Haggerty | F02C 7/222 |
| | | | 60/739 |
| 2010/0071663 A1 | 3/2010 | Patel et al. | |
| 2012/0048971 A1 | 3/2012 | Kaleeswaran et al. | |
| 2014/0007579 A1* | 1/2014 | Ainslie | F23C 5/08 |
| | | | 60/746 |
| 2015/0211418 A1 | 7/2015 | Pidcock et al. | |
| 2015/0322862 A1 | 11/2015 | Fuller et al. | |
| 2016/0273453 A1* | 9/2016 | Frish | F23R 3/283 |
| 2017/0241345 A1 | 8/2017 | Morenko et al. | |
| 2018/0306117 A1 | 10/2018 | Morenko | |

* cited by examiner

FUEL MANIFOLD ASSEMBLY

CROSS-REFERENCE TO RELATED APPLICATIONS

This application is a divisional of U.S. application Ser. No. 16/149,547 filed Oct. 2, 2018, the entire content of which is incorporated by reference herein.

TECHNICAL FIELD

The application relates generally to gas turbine engines and, more particularly, to fuel supply systems for combustors of such engines.

BACKGROUND OF THE ART

A fuel manifold assembly generally includes a circumferential array of fuel injectors configured to be mounted around a combustor of a gas turbine engine. The fuel injectors may be connected to each other using transfer tubes to circulate fuel from a fuel source to the fuel injectors around the combustor. In use, the fuel injectors are typically mounted to the combustor, and then the transfer tubes are connected between adjacent pairs of fuel injectors.

However, it may be difficult to mount the fuel manifold assembly on the gas turbine engine if a distance between the fuel injectors is short. In other words, it might be difficult to connect the transfer tubes to the fuel injectors mounted to the combustor if the distance between the pairs of fuel injectors is not enough to allow an adequate space or clearance distance to engage and disengage the transfer tubes. The distance between the fuel injectors may be short due to a number of the fuel injectors relative to a manifold pitch diameter.

SUMMARY

In one aspect, there is provided a fuel supply assembly for a gas turbine engine, the fuel supply assembly comprising a plurality of fuel injectors configured for mounting circumferentially to an engine casing of the gas turbine engine and to be serially interconnected, at least one pair of the plurality of fuel injectors having a first fuel injector including a first manifold adapter having a first outlet defined around a first outlet axis, and a first stem connected to the first manifold adapter at the first outlet and extending longitudinally along a first stem axis; and a second fuel injector including a second manifold adapter having a second outlet defined around a second outlet axis, and a second stem connected to the second manifold adapter at the second outlet, the first and second outlet axes being disposed circumferentially between the first and second stem axes.

In another aspect, there is provided a gas turbine engine comprising a combustor casing extending along an engine axis and circumferentially surrounding a combustion chamber; and a plurality of fuel injectors mounted circumferentially around the combustor casing and serially interconnected, at least one pair of the plurality of fuel injectors having a first fuel injector including a first manifold adapter having a first outlet defined around a first outlet axis, and a first stem connected to the first manifold adapter at the first outlet and extending longitudinally along a first stem axis; and a second fuel injector including a second manifold adapter having a second outlet defined around a second outlet axis, and a second stem connected to the second manifold adapter at the second outlet, the first and second outlet axes being disposed between the first and second stem axes.

In a further aspect, there is provided a method for installing a fuel supply assembly to a gas generator casing of a gas turbine engine, the method comprising interconnecting at least one pair of fuel injectors using an inner transfer unit; mounting the at least one pair of fuel injectors including the inner transfer unit to the gas generator casing; and connecting the at least one pair of fuel injectors to an adjacent fuel injector using an outer transfer unit, the outer transfer unit being longer than the inner transfer unit.

DESCRIPTION OF THE DRAWINGS

Reference is now made to the accompanying figures in which.

DETAILED DESCRIPTION

Figure 1:
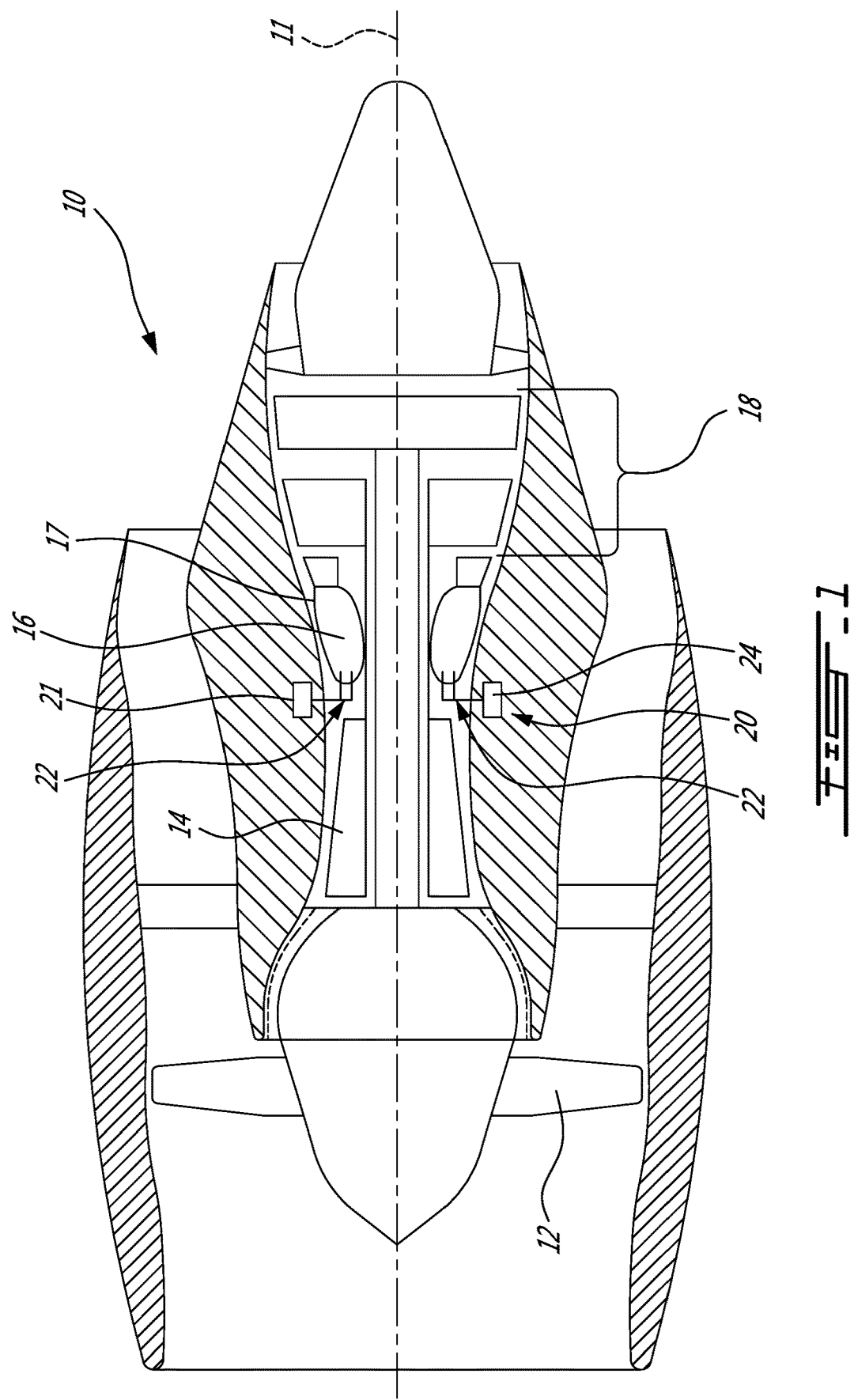
FIG. 1 is a schematic cross-sectional view of a gas turbine engine in accordance to a particular embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown in FIG. 1, the combustor 16 is surrounded by a gas generator casing 17 disposed around an engine axis 11. A fuel supply assembly 20 including fuel injectors 22 is mounted to the gas generator casing 17. The fuel injectors 22 are serially interconnected via at least one fuel transfer unit 24. The fuel supply assembly 20 may be connected to a source of fuel using any suitable connection. In operation, the fuel injectors 22 inject fuel into the combustor 16 for generating the annular stream of hot combustion gases.

Figure 2A:
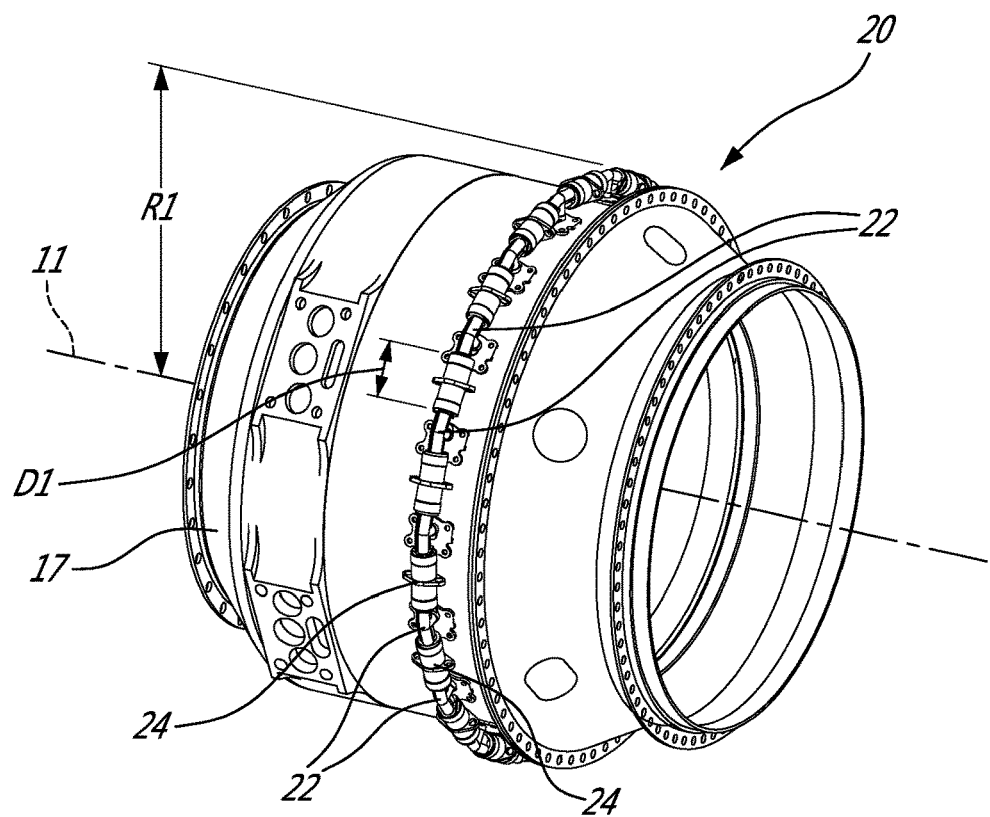
FIG. 2A is a perspective view of a fuel supply assembly mounted to a gas generator casing of the gas turbine engine of FIG. 1.

As shown in FIG. 2A, the plurality of circumferentially spaced-apart fuel injectors 22 are mounted to the gas generator casing 17 to circumferentially surround the combustor. The fuel injectors 22 are interconnected by the transfer units 24 to circulate the fuel circumferentially around the combustor 16. As such, the fuel supply assembly 20 may be referred to as a "fuel manifold assembly". A diameter of the gas generator casing 17 where the fuel supply assembly 20 is mounted defines the manifold pitch diameter. The radius of the manifold pitch diameter where the fuel injectors 22 are mounted in FIG. 2A is shown as R1. As such, a circumferential distance D1 between adjacent fuel injectors 22 may depend on a number of the fuel injectors 22 relative to the manifold pitch diameter. The number of the fuel injectors 22 may depend on the configuration of the gas turbine engine 10. In some embodiments, reducing the manifold pitch diameter may result in reducing the space or clearance distance between adjacent fuel injectors 22.

Figure 2B:
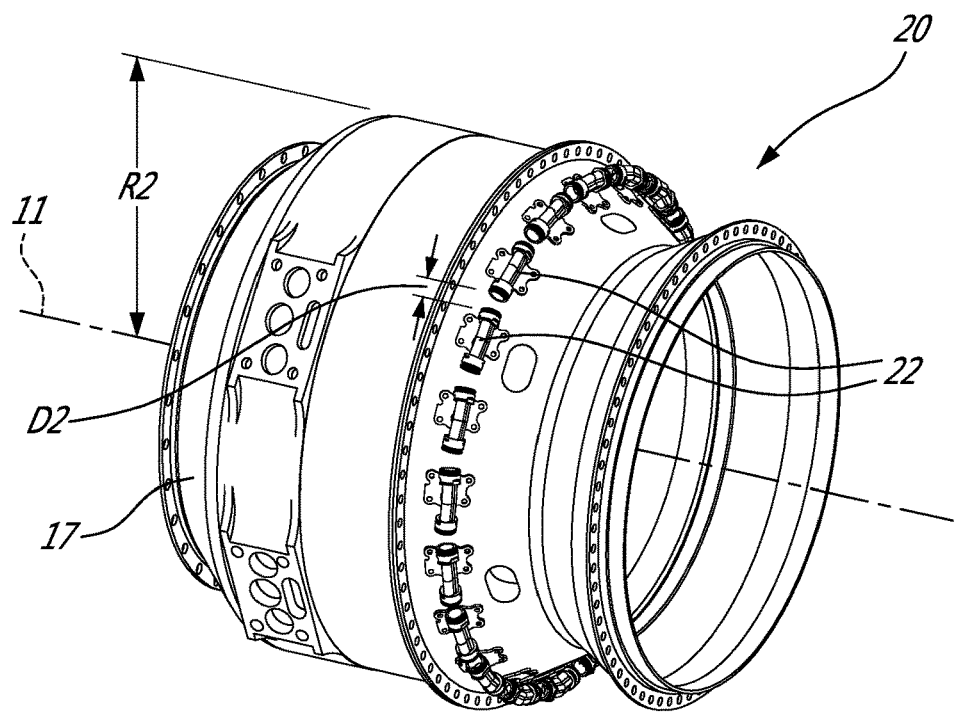
FIG. 2B is a perspective view of fuel injectors of the fuel supply assembly of FIG. 2A mounted to the turbine support casing.

FIG. 2B illustrates the fuel injectors 22 mounted to the turbine support casing 17 without the transfer units 24. The fuel supply assembly 20 is mounted to the casing 17 on a different axial location along the engine axis 11. As shown in FIG. 2B, the fuel supply assembly 20 is mounted on a smaller manifold pitch diameter. In other words, the radius R2 of the second manifold pitch diameter is smaller than the radius R1. Thus, a circumferential distance D2 between adjacent fuel injectors 22 at the second location is smaller than the circumferential distance D1 shown in FIG. 2A.

Figure 3A:
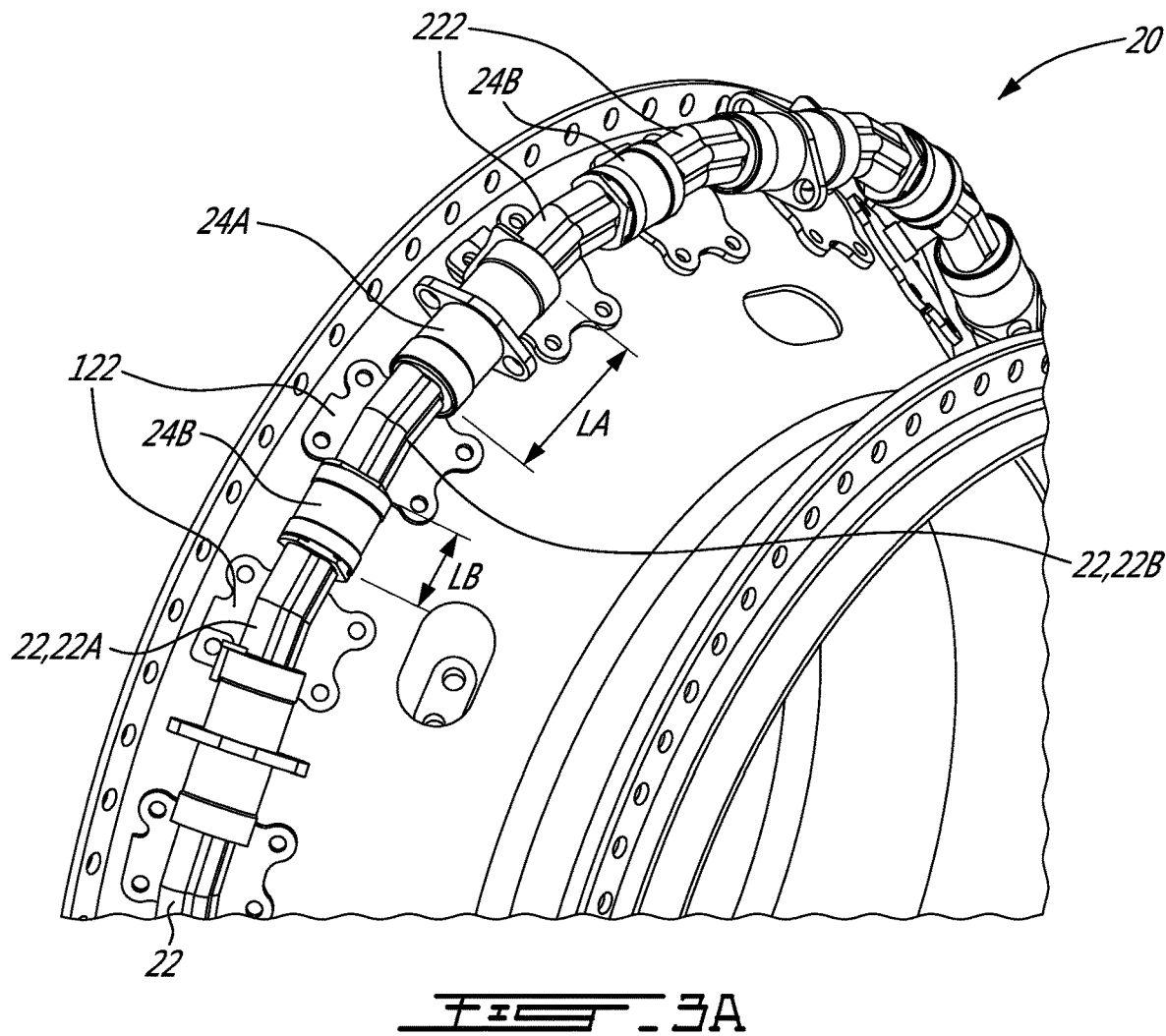
FIG. 3A is an enlarged section of the fuel supply assembly of FIG. 2A.

Referring to FIG. 3A, the fuel supply assembly 20 includes a plurality of sub-groups of at least two fuel injectors 22. For example, the fuel supply assembly 20 may include a predetermined number of pairs of fuel injectors 22. In some embodiments, only part of the total number of fuel injectors 22 are provided as pairs. In other words, the fuel supply assembly 20 may include an uneven total number of fuel injectors 22. In the embodiment shown in FIG. 3A, two pairs 122, 222 of fuel injectors 22 are shown. The pairs of fuel injectors 122, 222 are interconnected by an outer transfer unit 24A. Each one of the two pairs of fuel injectors 122, 222 includes an inner transfer unit 24B that interconnects the two fuel injectors 22 thereof. A circumferential length LA of the outer transfer unit 24A is longer than a circumferential length LB of the inner transfer unit 24B. In other words, the length LB of the inner transfer unit 24B is shorter than the length LA of the outer transfer unit 24A. As such, the circumferential distance between adjacent fuel injectors 22 of the same pair of fuel injectors 122 or 222 is less than the circumferential distance between adjacent fuel injectors 22 of different pairs of fuel injectors 122 and 222.

Figure 3B:
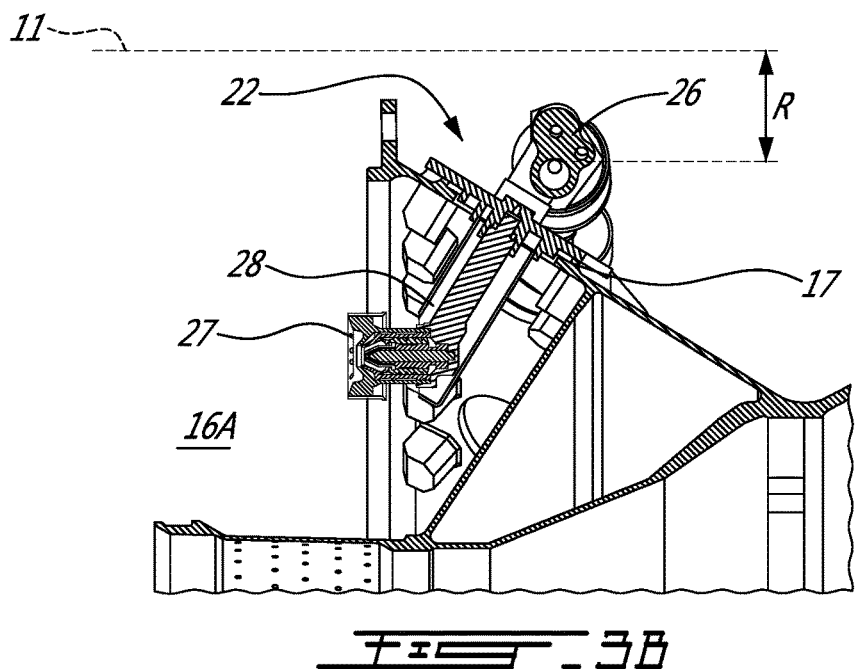
FIG. 3B is a cross-sectional view of the fuel supply assembly of FIG. 2B.

Referring to FIG. 3B, a cross-section of the fuel injector 22 is shown. The fuel injector 22 includes a manifold adapter 26 mounted to the gas generator casing 17 to receive the fuel, a nozzle head 27 to inject the fuel into the combustor 16, and a stem 28 connecting the manifold adapter 26 to the nozzle head 27. The nozzle head 27 may partially protrude into a combustion chamber 16A of the combustor 16. The nozzle heads 27 and/or the stems 28 of the fuel injectors 22 may be uniformly distributed circumferentially around the engine axis 11. The manifold adapter 26 of one fuel injector 22 is connected to a manifold adapter 26 of an adjacent fuel injector 22 by the transfer unit 24. As such, the transfer unit 24 is disposed in the space or clearance distance between adjacent manifold adapters 26. A radial distance between the engine axis 11 and a reference point of the manifold adapter 26 defines the radius R of the manifold pitch diameter.

Figure 4A:
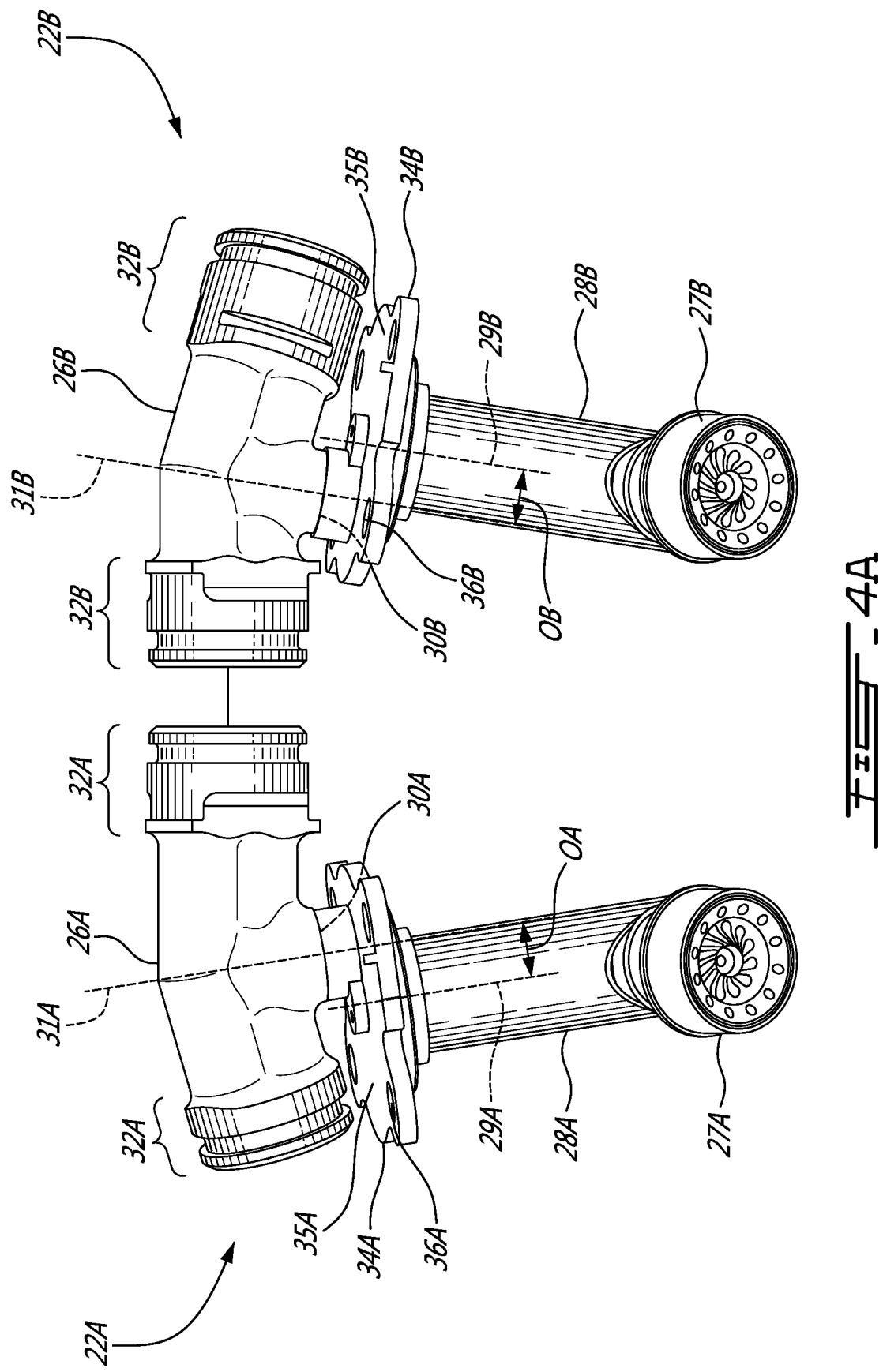
FIG. 4A is a front view of a pair of the fuel injectors of FIG. 2B.

Referring to FIG. 4A, a front view of the pair of fuel injectors 122 is shown. The pair of fuel injectors 122 includes a first fuel injector 22A and an adjacent second fuel injector 22B. The first fuel injector 22A includes a first manifold adapter 26A having a first outlet 30A defined around a first outlet axis 31A. The first outlet axis 31A may extend radially from the engine axis 11. For example, the first manifold adapter 26A may have the first outlet 30A disposed between two circumferentially opposed first ends 32A. In other words, the first manifold adapter 26A may have a T-shape. The first fuel injector 22A includes a first stem 28A connected to the first manifold adapter 26A and extending longitudinally along a first stem axis 29A. The first stem axis 29A may extend radially from the engine axis 11. The first fuel injector 22A may include a first nozzle head 27A connected to the first stem 28A to spray fuel into the combustor 16. In the embodiment shown in FIG. 4A, the first stem 28A is connected to the first manifold adapter 26A at the first outlet 30A. For example, the first fuel injector 22A includes a first connector 34A connecting the first manifold adapter 26A with the first stem 28A. The first connector 34A may include a first flange 35A having first apertures 36A defined therein to connect the first connector 34A to the gas generator casing 17. For example, fasteners may extend through the first apertures 36A and the gas generator casing 17. In some embodiments, the first stem 28A may be connected directly to the first manifold adapter 26A. In other words, the first connector 34A may be omitted or may be integral to the first manifold adapter 26A, the first stem 28A, or both. In operation, fuel transferred through the transfer units 24 may be flown to the first stem 28A through the first outlet 30A.

The second fuel injector 22B includes a second manifold adapter 26B having a second outlet 30B defined around a second outlet axis 31B. The second outlet axis 31B may extend radially from the engine axis 11. For example, the second manifold adapter 26B may have the second outlet 30B disposed between two circumferentially opposed second ends 32B. In other words, the second manifold adapter 26B may have a T-shape. The second fuel injector 22B includes a second stem 28B connected to the second manifold adapter 26B and extending longitudinally along a second stem axis 29B. The second stem axis 29B may extend radially from the engine axis 11. The second fuel injector 22B may include a second nozzle head 27B connected to the second stem 28B to spray fuel into the combustor 16. In the embodiment shown in FIG. 4A, the second stem 28B is connected to the second manifold adapter 26B at the second outlet 30B. For example, the second fuel injector 22B includes a second connector 34B connecting the second manifold adapter 26B with the second stem 28B. The second connector 34B may include a second flange 35B having second apertures 36B defined therein to connect the second connector 22B to the gas generator casing 17. For example, fasteners may extend through the second apertures 36B and the gas generator casing 17. In some embodiments, the second stem 28B may be connected directly to the second manifold adapter 26B. In other words, the second connector 34B may be omitted or may be integral to the second manifold adapter, the second stem 28B, or both. In operation, fuel transferred through the transfer units 24 may be flown to second stem 28B through the second outlet 30B.

As shown in FIG. 4A, the first and second outlet axes 31A, 31B are disposed circumferentially between the first and second stem axes 29A, 29B. In other words, there is an offset OA between the first stem axis 29A and the first outlet axis 31A in the circumferential direction. Similarly, there is an offset OB between the second stem axis 29B and the second outlet axis 31B in the circumferential direction. As such, in some embodiments, the circumferential distance between adjacent stem axes 29A, 29B of the pair of fuel injectors 122, 222 may remain constant or uniform around the engine axis 11. That is to say, the circumferential distance between the first outlet axis 31A and the second outlet axis 31B may be shortened without shortening the circumferential distance between the first stem axis 29A and the second stem axis 29B.

Figure 4B:
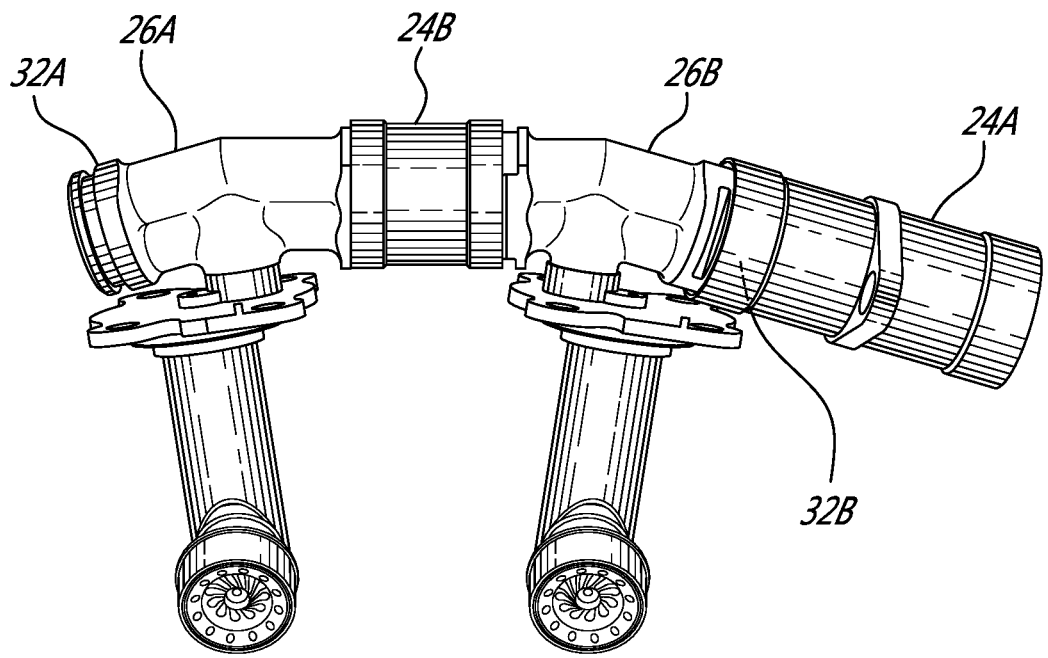
FIG. 4B is a view of the pair of fuel injectors of FIG. 4A interconnected by an inner transfer unit.

Referring to FIG. 4B, the first manifold adapter 26A is connected to the second manifold adapter 26B using the inner transfer unit 24B. In use, the pair of fuel injectors 122, 222 may be connected to the inner transfer unit 24B prior to being installed on the casing 17. The outer transfer unit 24A may connect to an outer end 32A of the first manifold adapter 26A or to an outer end 32B of the second manifold adapter 26B. For example, once the pair of fuel injectors 122, 222 and the corresponding inner transfer unit 24B are mounted to the casing 17, the outer transfer units 24A may be connected to the adjacent pairs of fuel injectors 122, 222. In some embodiments, by connecting the first and second manifold adapters 26A, 26B with the shorter inner transfer unit 24B, a longer clearance space may be provided to install the longer outer transfer units 24A.

Figure 4C:
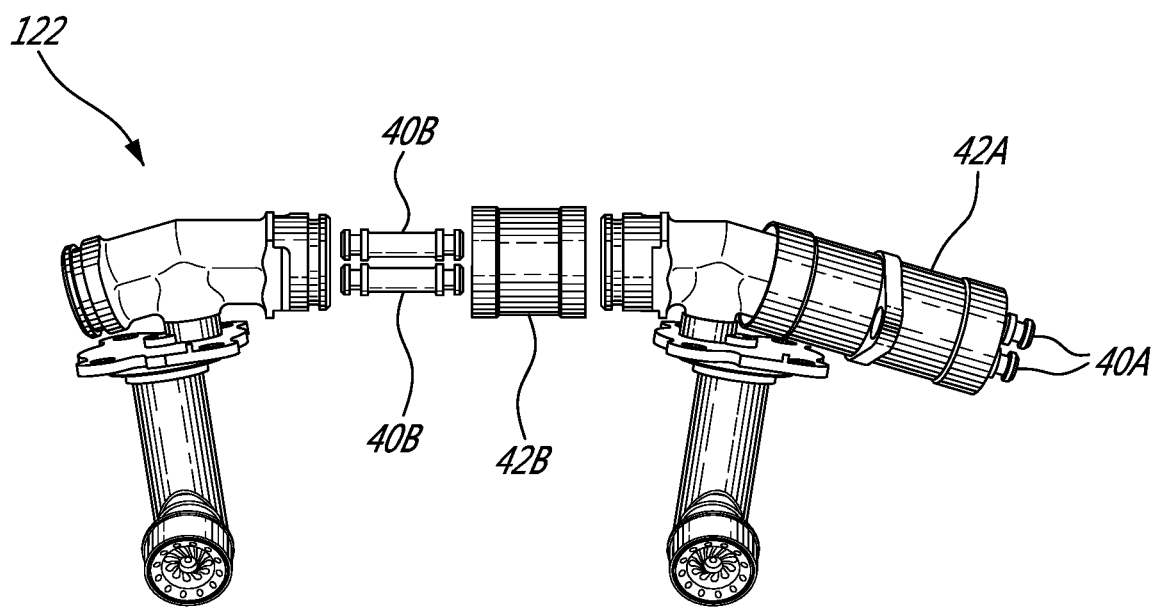
FIG. 4C is an exploded view of the pair of fuel injectors of FIG. 4B.

Referring to FIG. 4C, an exploded view of the pair of fuel injectors 122 is shown. The inner transfer unit 24B includes two inner transfer tubes 40B and an outer sleeve 42B surrounding the inner transfer tubes 40B. Similarly, the outer transfer unit 24A includes two transfer tubes 40A and an outer sleeve 42B surrounding the two outer transfer tubes 40A. In the embodiment shown in FIG. 4C, the outer sleeve 42B includes a flange having an aperture. The aperture may connect to any part or accessory of the gas turbine engine 10. Other configurations of the outer and inner transfer units 24A, 24B may be provided. For example, the transfer unit 24 may include one transfer tube 40.

Figure 5:
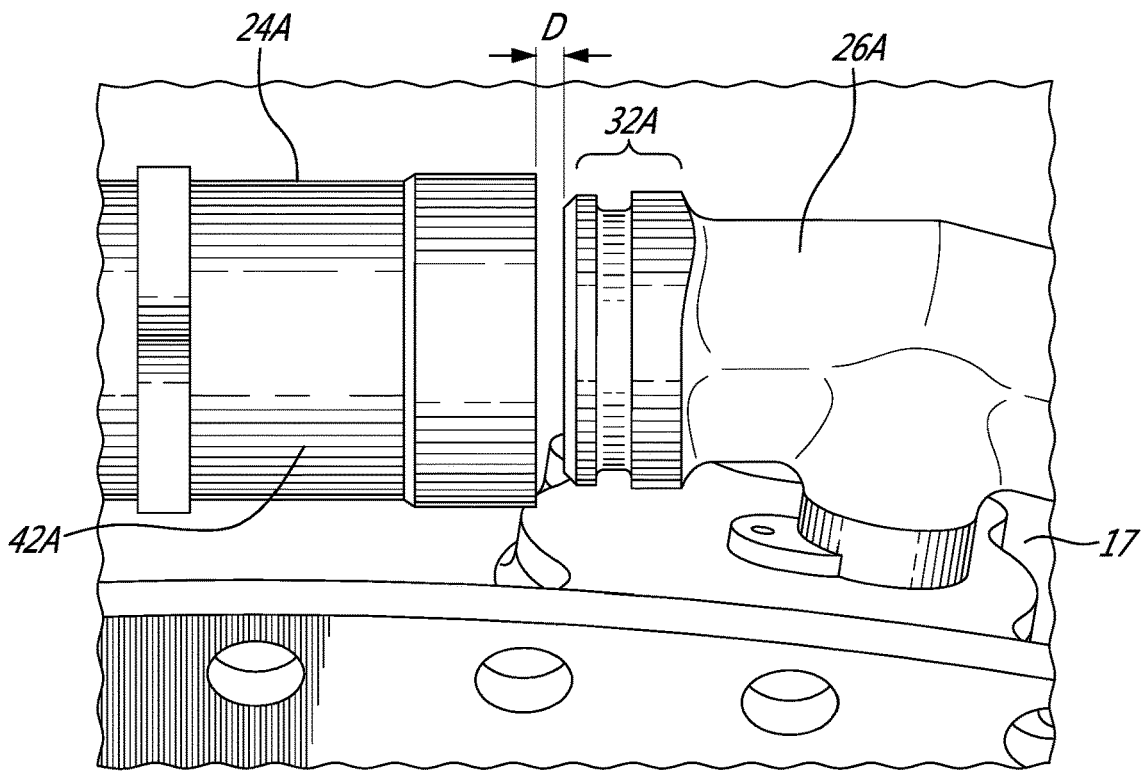
FIG. 5 is a perspective view of a clearance distance between an outer transfer unit and one of the fuel injectors of FIG. 2A.

Referring to FIG. 5, a clearance distance D between the first manifold adapter 26A and the outer transfer unit 24A is shown. In use, the outer transfer unit 24A may slide over the end 32A of the first manifold adapter 26A to connect the outer sleeve 42A to the first manifold adapter 26A. In other words, installing the pair of fuel injectors 122, 222 closer to each other may result in some room or clearance distance D to slide the outer transfer unit 24A circumferentially back and forth. As such, the outer transfer units 24A may be mounted to the manifold adapters 26 that have been previously installed on the casing 17. In some embodiments, this may allow the fuel manifold assembly 20 to be mounted on a smaller manifold pitch diameter. As such, the stem axes 29 of the fuel injectors 22 may remain uniformly distributed circumferentially around the engine axis 11.

Figure 6:
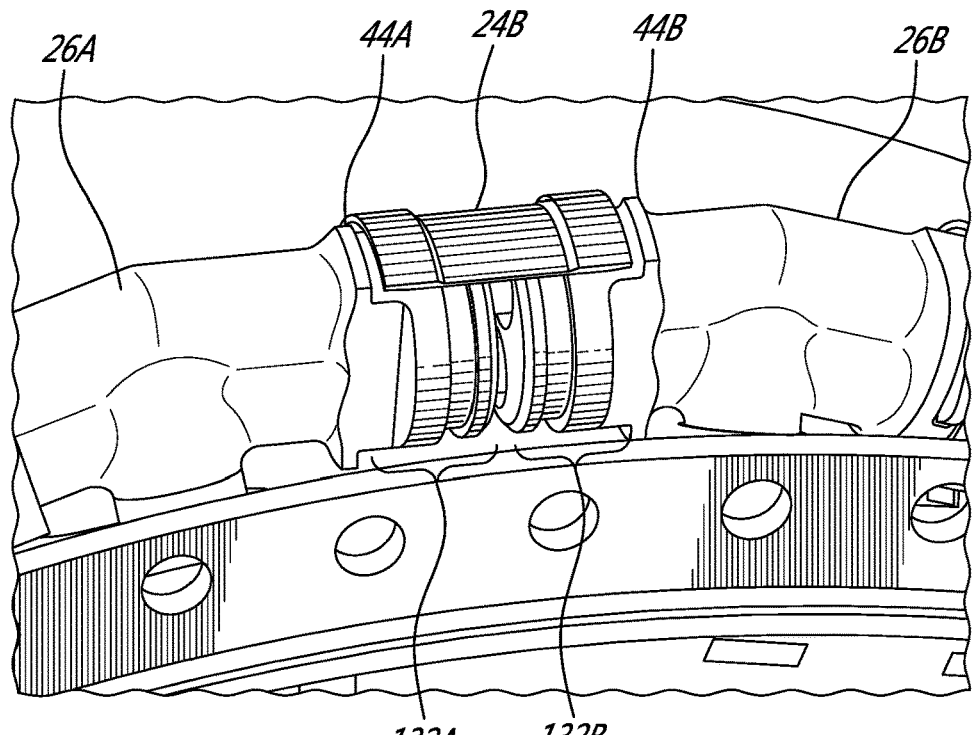
FIG. 6 is a perspective view of shoulders of the pair of fuel injectors retaining the inner transfer unit of FIG. 3B.

Referring to FIG. 6, the first manifold adapter 26A has a first shoulder 44A extending radially outwardly from the end 132A. The second manifold adapter 26B has a second shoulder 44B extending radially outwardly from the end 132B opposing the end 132A. In the embodiment shown in FIG. 6, the shoulders 44A, 44B extend circumferentially around the ends 132A, 132B. The shoulder 44A, 44B may have different geometry. For example, the shoulder 44A, 44B may not extend around a perimeter of the end 132A, 132B. In other words, only a portion of the end 132A, 132B may have a protruding shoulder segment. The shoulders 44A, 44B are configured to retain the inner transfer unit 24B between the first and second shoulders 44A, 44B. That is to say, the inner transfer unit 24B may be mounted to the first and second manifold adapters 26A, 26B between the first and second shoulders 44A, 44B prior to installing the first and second manifold adapters 26A, 26B to the casing 17. In some embodiments, the shoulders 44A, 44B may substitute the use of retaining brackets to connect the inner transfer unit 24B to the first and second manifold adapters 26A, 26B.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method for installing a fuel supply assembly on a gas generator casing of a gas turbine engine having a central axis, the method comprising:
    assembling at least one pair of fuel injectors using an inner transfer unit, the inner transfer unit comprising at least one inner transfer tube fluidly connecting the at least one pair of fuel injectors, the at least one inner transfer tube surrounded by a sleeve trapped between the at least one pair of fuel injectors;
    mounting the at least one pair of fuel injectors assembled with the at least one inner transfer unit to the gas generator casing, the at least one inner transfer tube and the sleeve extending in a circumferential direction relative to the gas generator case; and
    connecting the at least one pair of fuel injectors to an adjacent fuel injector using an outer transfer unit, the outer transfer unit including an outer transfer tube, the outer transfer tube being longer than the inner transfer tube in the circumferential direction,
    wherein the at least one pair of fuel injectors include a first pair of fuel injectors and a second pair of fuel injectors immediately adjacent to the first pair of fuel injectors, the first pair of fuel injectors comprising a first fuel injector and a second fuel injector separated by a first circumferential distance, the second pair of fuel injectors comprising a third fuel injector and a fourth fuel injector separated by a second circumferential distance, the second fuel injector being positioned circumferentially between the first fuel injector and the third fuel injector to define a third circumferential distance between the second fuel injector and the third fuel injector,
    wherein each of the first circumferential distance and the second circumferential distance are less than the third circumferential distance.

2. The method as defined in claim 1, wherein assembling the at least one pair of fuel injectors includes retaining the sleeve in the circumferential direction between a pair of shoulders of the at least one pair of fuel injectors.

3. The method as defined in claim 1, wherein the at least one pair of fuel injectors each include a manifold adapter, a stem projecting radially inwardly from the manifold adaptor relative to the central axis, and a nozzle head.

4. The method as defined in claim 1, wherein connecting the at least one pair of fuel injectors to the adjacent fuel injector using an outer transfer unit comprises: slidably engaging the outer transfer tube in the circumferential direction between the first and second pairs of fuel injectors.

5. The method as defined in claim 1, comprising providing a clearance distance D in the circumferential direction around the gas generator case to slide the outer transfer unit circumferentially back and forth relative to the at least one pair of fuel injectors and the adjacent fuel injector.

* * * * *